(12) United States Patent
Jellema et al.

(10) Patent No.: US 6,487,676 B1
(45) Date of Patent: Nov. 26, 2002

(54) VALIDATION OF PROCEDURES

(75) Inventors: Bart Jellema, Rijen (NL); Rene Peeren, Osterhart (NL); Louise Croughan, Osterhart (NL); Freek Aben, Rykewoort (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/214,900

(22) PCT Filed: Jul. 16, 1997

(86) PCT No.: PCT/EP97/03799

§ 371 (c)(1),
(2), (4) Date: May 7, 1999

(87) PCT Pub. No.: WO98/04091

PCT Pub. Date: Jan. 29, 1998

(30) Foreign Application Priority Data

Jul. 19, 1996 (NL) .............................................. 9615150

(51) Int. Cl.[7] .............................................. G06F 11/00
(52) U.S. Cl. .............................. 714/1; 714/50; 379/15.3
(58) Field of Search ................................ 714/1, 49, 50, 714/33; 379/201.03, 201.08, 15.02, 15.03, 29.08

(56) References Cited

U.S. PATENT DOCUMENTS

| 4,694,422 A | * | 9/1987 | Kakuda et al. ................ 714/49 |
| 4,754,400 A | * | 6/1988 | Wakahara et al. ............. 714/1 |
| 5,161,115 A | * | 11/1992 | Teshima et al. ............ 702/108 |

(List continued on next page.)

FOREIGN PATENT DOCUMENTS

| EP | 0 505 092 A2 | 9/1992 |
| EP | 0 555 997 A2 | 8/1993 |
| EP | 0 559 339 A2 | 9/1993 |
| EP | 0 579 302 A1 | 1/1994 |
| EP | 0 690 395 A2 | 1/1996 |
| EP | 0 705 012 A2 | 4/1996 |
| WO | WO 94/06252 | 3/1994 |
| WO | WO 95/10912 | 4/1995 |
| WO | WO 95/32573 | 11/1995 |

OTHER PUBLICATIONS

Cypher. Lee, Martin–Villalba, Prins and Su "Formal Specification, Verification, and Automatic Test Generation of ATM Routing Protocol: PNNI".*
Dakroury, Elloy and Ricordel "Specification of a Secured Multi–server MMS protocol" IEEE 1995.*
Cho, Hachtel, MAcii, Plessier and Somenzi "Algorithms for Approximate FSM Traversal" ACM 1993.*
Cai "An Object–Oriented Model for Intelligent Networks" ACM 1992.*
Yoshiaki Kakuda et al., "A Dynamic Resolution Method for Feature Interactions and Its Evaluation", pp. 97–114, Oct. 11, 1995.
Yasuro Kawarasaki et al., "A New Proposal for Feature Interaction Detection and Elimination", 127–139, Oct. 11, 1995.
Norbert Fritsche, "Runtime Resolution of Feature Interactions in Architectures with separated Call and Feature Control", pp. 43–63, Oct. 11, 1995.
T.W. Abernethy et al., "Intelligent Networks, Standard and Services", pp. 9–20, Apr. 1995.
C.D. Sharp et al., "Advanced Intelligent Networks—Now a Reality", pp. 153–162, June 1994.

*Primary Examiner*—Robert Beausoleil
*Assistant Examiner*—Bryce P. Bonzo
(74) *Attorney, Agent, or Firm*—Burns, Doane, Swecker & Mathis, L.L.P.

(57) ABSTRACT

A method of validating a procedure allows several processes to be involved in the validation of a single event. The method involves defining relationships between FSMs which describe the entities, selecting the processes which fulfill certain criteria, and processing the event in all of the selected processes.

6 Claims, 2 Drawing Sheets

U.S. PATENT DOCUMENTS

| | | |
|---|---|---|
| 5,327,544 A | 7/1994 | Lee et al. |
| 5,394,347 A * | 2/1995 | Kita et al. .................... 700/86 |
| 5,418,793 A | 5/1995 | Chang et al. |
| 5,483,470 A * | 1/1996 | Alur et al. .................... 716/6 |
| 5,574,919 A | 11/1996 | Netravali et al. |
| 5,623,499 A * | 4/1997 | Ko et al. .................... 714/724 |
| 5,632,014 A * | 5/1997 | Ek et al. ........................ 714/33 |
| 5,740,236 A * | 4/1998 | Pruitt ........................ 379/111 |
| 5,768,498 A * | 6/1998 | Boigelot et al. .............. 714/33 |
| 6,324,496 B1 * | 11/2001 | Alur et al. .................... 703/17 |

* cited by examiner

VALIDATION OF PROCEDURES

This invention relates to a method of validating a procedure in a network protocol. In particular, the invention relates to a network protocol such as the Intelligent Network Application Protocol (INAP) required for support of Capability Set 1 (CS1) defined in the European Telecommunication Standard ETS 300 374.

In a protocol such as INAP CS1, there exist a number of valid procedures, or sequences of operations, which can be carried out to perform specific tasks. However, since the number of possible procedures is large, the valid procedures are not defined directly, but rather are defined by means of a set of rules. Any procedure, or sequence of operations, which does not violate these rules, is then considered a valid procedure.

In the prior art, the rules can be described by defining a finite state machine (FSM) in respect of each entity, and each interface, an interface being a boundary between two entities. The FSM then acts as a model for the behaviour of a process. An FSM consists of states, which can be connected to each other. A process can only be one state at any one time, but can move from one state to a connected state as a result of an event. On the transistor from one state to another, actions can be performed. Such a system is described in KAKUDA et al, "A Dynamic Resolution Method for Feature Interactions and its Evolution", Feature Interaction In Telecommunications Systems III, pages presented at the third Feature Interactions Workshop (FIW'9, KYOTO, JP, Oct. 11–13, 1995).

When using an FSM to validate a procedure in a network protocol, the events which control the FSM are then operations defined in the protocol, or other events coming from other processes, such as the call process. The rules, which define the valid procedures in a network protocol such as INAP CS1, are the Single Association Control Function (SACF) and the Multiple Association Control Function (MACF) rules. The SACF rules apply where there is a single association, and the MACF rules apply where there are several related associations, an association being a signalling channel, using a specific interface, which allows communication between two entities.

Unfortunately, describing all of the SACF rules and MACF rules formally with a single FSM requires an excessively complex FSM. The result is that many procedures, including all MACF procedures, are still defined in natural language. There are no mechanisms to validate rules for this type of procedure, namely procedures which cannot be specific in terms of a single FSM per association.

The present invention is concerned with a method of validating a procedure by allowing the rules to be specific by multiple FSMs. Specifically, several processes, each running a specific FSM, are allowed to be involved in the validation of a single event.

The validation of an event takes place in two phases. Firstly, the relevant processes are selected, by assessing whether they meet specific criteria. In the second processing phase, all of the selected processes process the event.

This has the advantage that all of the involved processes are in a stable state, before an event is processed by any of them.

For a better understanding of the present invention, reference will now be made, by way of example, to the accompanying drawings.

In accordance with the invention, the validation of a procedure may involve several processes, and the first phase of the validation includes selecting the processes which are to be involved in the validation.

The selection of the processes uses criteria based on the characteristics and interrelationship of the FSMs which represent the respective entities and interfaces.

Figure 1:
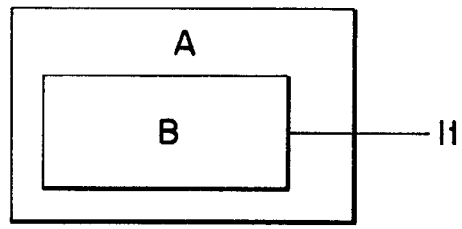
FIG. 1 is a representation of two FSMs which share a container interface.

Firstly, it is determined whether any of the FSMs share a "Container Interface". FIG. 1 is a representation of two FSMs A and B which share a container interface. When two FSMs share this type of interface, then one is said to be included in the other, which in its turn contains the first. In the example of FIG. 1, FSM A contains FSM B, and FSM B is included in FSM A. A first FSM, included in a second, FSM, is by definition also included in any third FSM that contains the second FSM. That, is if A is included in B, and B is included in C, then by definition A is also included in C. It can be said that A is indirectly included in C. Unless mentioned otherwise, the term "included", as used herein, means both directly and indirectly included, and as such could specify a relation between more than two FSMs. Interactions between processes via an association on a Container Interface are treated differently from other types of interaction.

An interface can be classified as a container-interface if the following applies to both FSMs:
  an FSM is only directly included in one other FSM;
  an FSM is not included in itself;
  a process running an FSM does not have associations with more than one process that runs an FSM in which the first is directly included.

Returning to FIG. 1, therefore, a process running FSM B will only have an association with a maximum of one process running FSM A. A process running FSM A may however have associations with several processes running FSM B (these associations are thus related in the process running FSM A). A or B may also have other (non-container) interfaces. In FIG. 1, FSM B is shown as having one other interfaces I1.

Details of inclusion-relations can easily be stored in a system in the form of a tree, hereafter referred to as an FSM-tree. The root of the FSM-tree is an FSM that is not included in any other FSM. The leaves of the FSM-tree are FSMs that do not contain any other FSM.

Figure 2:
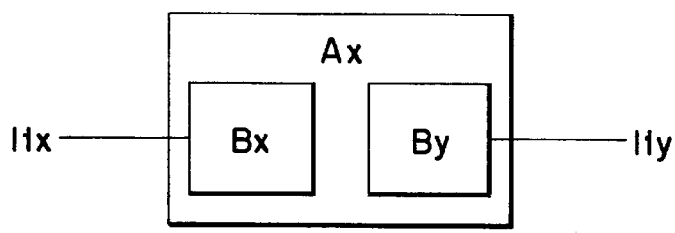
FIG. 2 represents a situation in which a process Ax, running A, includes two processes Bx and By, running B.

The concept of inclusion also applies to processes: one process is included in another process if the FSM, which is run by the first, is included in the FSM run by the second. Additionally the two processes must also be associated, either directly or indirectly, via a process with which they both are (directly or indirectly) associated. For example, FIG. 2 represents a situation in which a process Ax, running A, includes two processes Bx and By, running B.

Like FSMs, details of these inclusion-relations can easily be stored in a system in the form of a tree, hereafter referred to as a process-tree. When scanning the process-tree, either a separate data-structure can be used, or the associations between the processes can be used. The set of processes that are within one and the same process-tree form one basis for the selection-process.

The second characteristic used in defining the selection criteria for the processes is the "Container Context", which is a set of pre-defined values, identifying different possible contexts of an event to be validated. Different events, using the same association, may thus have different contexts. For example, in CS1, some operations are within the context of a single party involved in the call.

Processes may also be allocated a Container Context. In this case, this identifies a relationship between an event and a specific process.

Thus, when an event (the "current event") is to be validated, it is possible to identify a set of processes that matches the Container Context of the current event.

The allocation of Container Contexts is carried out by allocating to each FSM a set of Container Contexts: Fx= (CC1, CC2, . . . , CCn). A Container Context cannot be allocated to an FSM if it has already been allocated to an FSM which it contains, or is included in. This is to be checked by the system when Container Contexts are allocated to FSMs. An event can be allocated a single Container Context. This Container Context is then also allocated to the current event, and is referred to as the "current Container Context". Given the set of events that may arrive on a certain interface, all possible Container Contexts for the set of events must have been allocated to an FSM which is, contains, or is included in the FSM that shares the interface.

Each process in a process-tree is allocated a Container Context from Fx, such that different processes running the same FSM, and part of the same process-tree, are allocated different Container Contexts.

For example, in a protocol, there may be 30 possible leg-ids that each can be used as a Container Context. Some operations apply to the whole call (e.g. ReleaseCall), and they will have the call as Container Context. An operation that can have a leg-id as parameter is seen as 30 separate events (one for each possible leg-id). This requires an analysis of the operation in order to map it to one of the 30 possible events (i.e. the leg-id parameter, or the default leg-id value, determines the mapping from operation to event).

The third characteristic used in defining the selection criteria for the processes is the "Container Actions", which is a special set of actions that can be specified at state-transitions in an FSM. These actions may affect the processing of the current event by other processes. For example they may cause another process not to process the event, even though it was designated to do so.

Each system will have a number of Container Actions defined. Since Container Actions may influence other processes, conflicts may arise when several processes execute Container Actions that affect each other. The system must have specified clear interactions between these Container Actions. For example, Container Actions with higher priority exclude all Container Actions with lower priority (for the current event). The principles used for defining these interactions are not described further herein; it is assumed that the system, given a set of Container Actions, can identify a sub-set of Container Actions that will be allowed. This sub-set is hereafter referred to as the current "Container Actions".

In order for the system to be able to co-ordinate the different Container Actions from different processes, two stages are required prior to processing an event.

Firstly, given a set of processes that may process the event, the Container Actions are collected that these processes will execute once they process the event. This will require pre-processing of an event by the processes involved: the resulting state-transitions are determined (since these determine the actions that will be performed), but are not performed.

Secondly, based on the collected Container Actions, and the priority defined between them in the system, the system will create the current Container Actions.

When an event is to be processed by a set of processes, their Container Actions may have to be co-ordinated, in order to avoid the same action being executed twice.

As described above, the first phase of the validation includes selecting the processes which are to be involved in the validation, using criteria based on the characteristics described above.

Even though there is a process that receives the event initially via an association, the event will not be processed immediately by that process. Although the receiving process always will be selected as a result of the selection-phase, it is only when it has been selected that the process may process the event.

As part of the selection phase, it is determined if there is a current Container Context. If there is no current Container Context, then only the process that received the event is selected. If there is a current Container Context, then any process that fulfils the two following criteria will be selected. Firstly, the process must either hold, or contain a process that holds, or be included in a process that holds the Container Context, which is its turn is, contains, or is included in the process that received the event. Secondly, the process must not execute any Container Actions other than one of the current Container Actions.

The selection-phase starts by examining the process that received the event. From there, the process-tree is scanned towards the root and towards the leaves. For every process scanned, it is checked whether it matches the Container Context. Each matching process is added to the selection. Several optimisations apply. Firstly, if a matching process contains the process that received the event, then there will not be any other matching process. This is because a Container Context cannot be allocated to an FSM, if that FSM already contains, or is included in, an FSM that has the Container Context allocated. Secondly, if a matching process has been found, then there will not be any other matching process that runs the same FSM.

This will give at least one matching process, and, for every matching process found, the process-tree is again scanned towards the root and leaves. Each matching process is now added to the selection, provided it has not previously been selected.

Then, as discussed previously, the event is pre-processed by all of the selected processes. This will result in the current Container Actions, which in turn determine the final set of processes in the selection.

For the selection-process to work properly, it must appear as if the complete process-tree is available before the first event is validated. This means that, for every FSM, a process must exist in the process-tree for any Container Context allocated to it (even if it may be in state Idle). The overhead this would give is unacceptable for any system. The following method can be used to create processes on demand:

If, during the selection-process, the end of the tree is reached (which process is hereafter referred to as: last process), but the FSM run by the last process (referred to hereafter as the last FSM) is not the root or leaf of the corresponding FSM-tree, then:

When scanning towards the root, one process is created for the FSM in which the last FSM is directly included, if that FSM is or is included in an FSM that has specified a state-transition from Idle for the current event, with an action other than 'no action'.

When scanning towards the leaves, one or more process is created for each FSM directly included in the last FSM and which is or contains an FSM that has specified a state-transition from Idle for the current event, with an action other than 'no action'. One process is created for the FSM if its Fx has the current Container Context as a member, or if its Fx is empty. Otherwise, one process for each member of the FSM's Fx is created. An association is then established with each process, after which tracing continues.

The system must known for each FSM for which events it will specify an action other than 'no action', if received in state Idle.

Processes can be removed, and any associations on container interfaces it has can be released, when it is in state Idle, and it does not contain any other processes. A situation may arise where a process is not in state Idle, but no longer has any associations, i.e. the process hangs. The system can detect this because the process is then a root as well as the only leaf. The system generates a special event in that case, e.g. 'orphaned', on which the process should go to Idle (if not, then it is considered an error).

After the selection-phase is complete, and a group of processes has been selected, each selected process processes the event independently of the other selected processes. The event can then be validated.

Since events may arrive on different associations, and a subsequent event cannot be processed until a previous event has been processed, queuing is required. An event is queued if there are already events queued, or if there is already a current event. Events are queued for the root-process of the process that received the event. Different queues may apply, depending on how many different priorities there are. Events received via Container Interfaces have higher priority than events received via other types of interfaces. Thus, queues for these events must be empty before an event from another queue can be taken. This gives all involved processes the chance to update each other before the next event to be validated is received.

Figure 3:
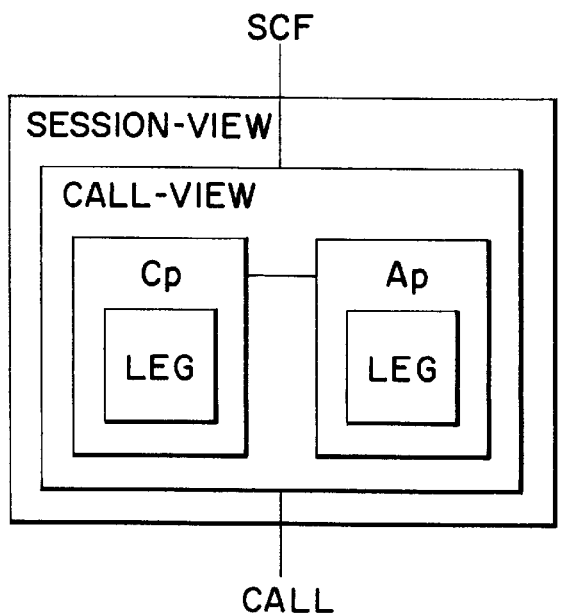
FIG. 3 represents an FSM, which itself consists of a number of other FSMs.

The invention will now be described in more detail with reference to its application to a specific example, taken from the Ericsson CS1+ INAP protocol for IN, which is described by a number of FSMs. One of these FSMs is the SSF-FSM, which itself consists of a number of FSMs, as shown in FIG. 3.

Thus, the Session-view FSM contains the Call-view FSM, which in turn contains the Cp and Ap FSMs. The Cp and Ap FSMs share an interface, but this is not a Container Interface.

The Call-view FSM has external interfaces with the call and the SCF (Service Control Function). It is on these interfaces that events may arrive which have to be verified against SACF- and MACF-rules.

The following Container-Actions are identified (presented in priority order):

bufferEvent. The event is buffered (the buffering-mechanism itself is not described here). No error-procedures are followed.

rejectEvent. The event is rejected: an error-procedure is followed.

Figure 4:
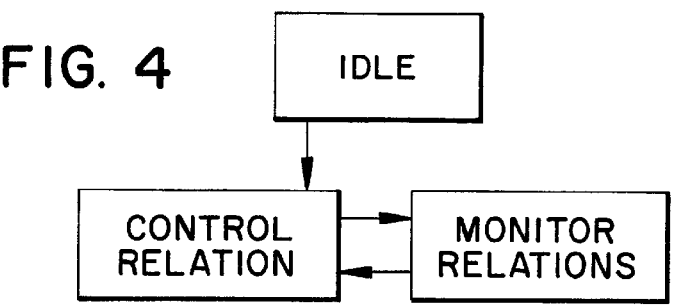
FIG. 4 represents the FSM for the session-view.

FIG. 4 represents the FSM for the session-view, which specifies the MACF-rules for INAP. There is one MACF-rule: several associations to several SCFs may exist simultaneously, but only one can control the call.

There are no operations which have the session-view as Container Context. Since the session-view includes all other FSMs, the session-view is always involved in the validation of every event.

A new association with the SCF is only allowed when the FSM for the session-view is in the state Idle, or Monitor Relations. So, when the FSM for the session-view is in the state Control Relation, the operation InitialDP (which starts a new association with the SCF) is rejected. The operation is then ignored.

Figure 5:
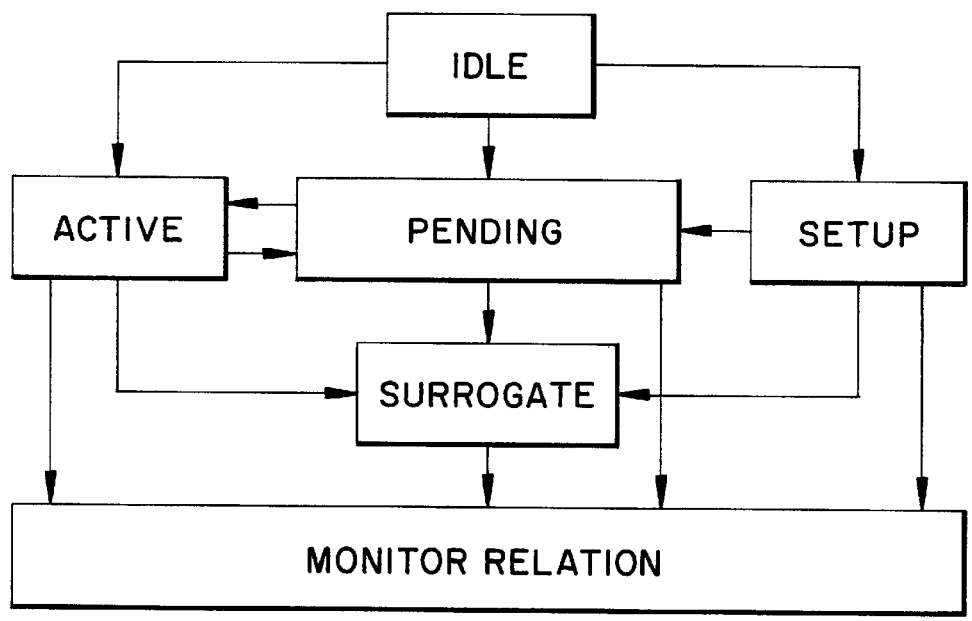
FIG. 5 represents the FSM for the call-view.

FIG. 5 represents the FSM for the call-view process, which specifies SACF-rules for the associations with the SCF, and the call. There is one call-view process per association with the SCF. The FSM represents the configuration of a call, as seen from a single SCF-process.

There are a few operations which have the call-view as Container Context, for example ReleaseCall.

The states: SetUp, Pending and Active correspond to states in the BCSM. While in SetUp, the SCF may still collect digits from the user using normal CCF-procedures (operation CollectInformation). Once in Pending, this is no longer possible (CollectInformation rejected). While in Active, the SCF cannot route the call (Connect rejected). The call can only return to Pending by a certain event from the call.

Once in Surrogate, the party that initiated the call has left the call. It is then no longer possible for the SCF to route the call (the event from the call that caused the FSM to transit from Active to Pending, will now cause a state-transition to the same state with no action). Once in Monitoring Relation, the SCF can no longer control the call, but may monitor events happening in the call (all controlling operations are rejected). It should be noted that, when entering the Monitor Relation state, an event is generated by this FSM, and sent to the session-view (in order to cause a state-transition to Monitor Relations).

Figure 6:
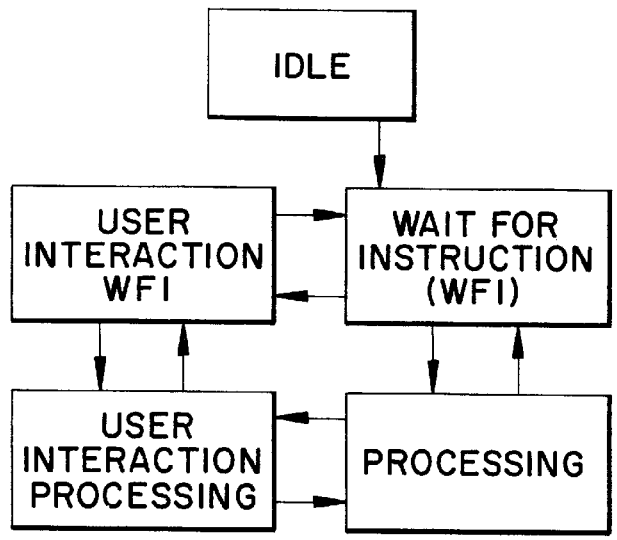
FIG. 6 represents the FSM for the Cp or Ap.

FIG. 6 represents the FSM for the Cp or Ap. The Cp and Ap have identical states. Within a call-view there can only be one Cp-view, but there a may be several Ap-views. The Cp or Ap specifies SACF-rules for the association with the SCF, and the call, for those operations in which the Cp or Ap are involved.

The FSM represents the synchronisation procedures between the SSF and SCF, and the procedures to interact with a call-party (other than using the normal CCF-procedures).

There are no operations that have the Cp or Ap as Container Context. Which of the views is involved is determined by the FSM contained in the Cp and Ap, the leg.

There is an interface between the Cp and Ap, as shown in FIG. 3, which is used to move legs from one view to another (in effect, it means that the included process for the leg is releases, and a new one is started on the other side).

In state WFI in the FSM, the Cp- or Ap-process is synchronised with the SCF, although the synchronisation may be broken if the user hangs up (event coming in from a CLSM-process). It should be noted that different Ap-processes are consequently not synchronised together, and not with the Cp-process: the synchronisation does not apply to the complete call.

While user-interaction is ongoing (the FSM is in state User Interaction WFI, or User Interaction Processing), all operations will be buffered by the Cp, except Disconnect-ForwardConnection. The buffer is released when the FSM transits back to WFI or Processing. The Ap only buffers ReleaseCall, and this is only buffered locally, i.e. without affecting other FSMs. Therefore, the Ap does not use a Container Action for this.

With the FSM in the state Processing, the SSF and SCF run concurrently, i.e. they are not synchronised.

The FSMs for the legs in the Cp and Ap are identical, including all state-transitions, actions etc. These FSMs have only Idle and Active states. These FSMs sere as a Container Context for operations. Because the legs are identical in the Cp and Ap, and because each only has one state (beside Idle), a leg-process can be 'moved' from Ap to Cp and vice versa by transmitting the existing process from Active to Idle, and transmitting the existing process from Active to Idle, and transmitting a new one (in the target view) from Idle to Active.

The location of the leg thus determines whether the Cp-view, or an Ap-view, is going to be involved. The concept of "legs" represent network-resources allocated to a single party in a call. There can only be one leg in an Ap, but there may be several legs in the Cp.

Based on this, it is possible to determined the criteria which are to be used in selecting the processes which should process an event during the validation.

It should be noted that the concept of Container Interfaces can in general be used to describe the behaviour of a system, or part of a system, to external triggers (i.e. coming from other systems or part of the same system).

What is claimed is:

1. A method of validating an event in an Intelligent Network comprising a plurality of processes, the method comprising the steps of:

selecting a number of processes from said plurality of processes wherein said selected number of processes meet a predetermined criteria; and independently processing the event in each of the selected processes wherein the selecting step comprises defining relationships between Finite State Machines representing the processes, including defining container interfaces between the processes.

2. A method according to claim 1, wherein the predetermined criteria comprise:

determining whether any of the Finite State Machines share a container interface; and determining whether any of the Processes match a container context of a current event.

3. A method according to claim 1, wherein the event is received at a first process, and the method further comprises delaying processing of the event in the first process until completion of the selecting step.

4. A method according to claim 1, wherein the selecting step further comprises:

selecting a first set of processes which meet the predetermined criteria;

pre-processing the event in the first set of processes; and selecting a second set of processes on the basis of a result of the preprocessing.

5. A method according to claim 4, wherein the second set of processes are selected if they include current container actions.

6. A method according to claim 1, wherein the processing step further comprises queuing a received event until a previously received event has been processed.

* * * * *